May 1, 1934.  C. C. FARMER  1,956,674
FLUID PRESSURE BRAKE
Filed Feb. 5, 1930
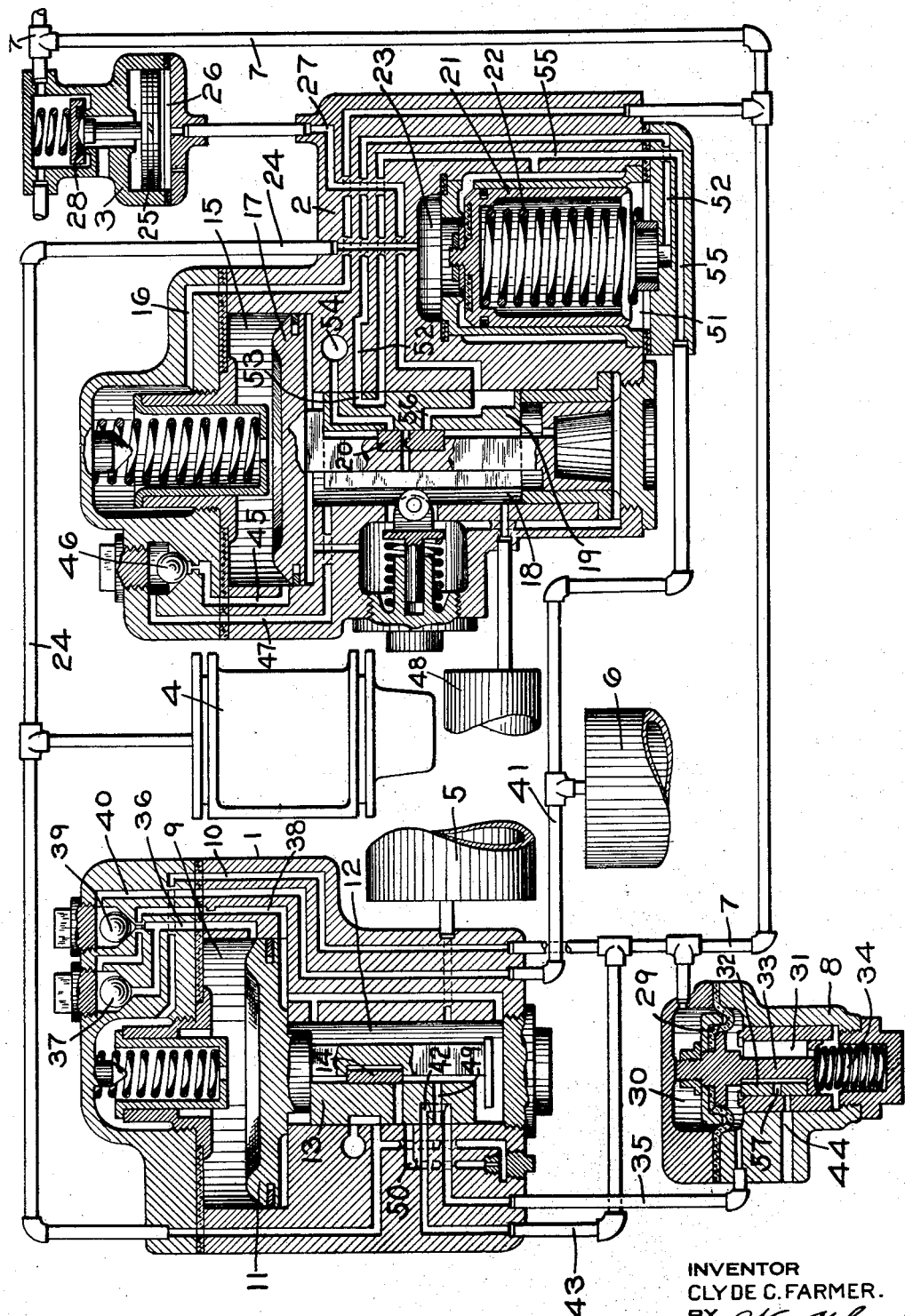
INVENTOR
CLYDE C. FARMER.
BY Wm. M. Cady
ATTORNEY Patented May 1, 1934

1,956,674

UNITED STATES PATENT OFFICE 1,956,674

FLUID PRESSURE BRAKE

Clyde C. Farmer, Pittsburgh, Pa., assignor to The Westinghouse Air Brake Company, Wilmerding, Pa., a corporation of Pennsylvania Application February 5, 1930, Serial No. 426,061

7 Claims. (Cl. 303—70)

This invention relates to fluid pressure brakes, and more particularly to means for effecting the release of the brakes.

On long trains, the rate of rise in brake pipe pressure in releasing the brakes is slow, especially at the rear of the train, and tends to slow up as the brake pipe pressure approaches the normal standard pressure carried. The slow rise in brake pipe pressure may, in some cases, fail to effect the release movement of the triple or equalizing valve device, particularly after an emergency application of the brakes.

The principal object of my invention is to provide means for facilitating the release of the brakes after an emergency application of the brakes has been effected.

In the accompanying drawing, the single figure is a diagrammatic view, partly in section of a fluid pressure brake equipment embodying my invention.

As shown in the drawing, the equipment may comprise a triple or equalizing valve device 1, an emergency high pressure valve device 2, a brake pipe vent valve device 3, a brake cylinder 4, an auxiliary reservoir 5, an emergency reservoir 6, a brake pipe 7, and a release controlling valve device 8.

The triple valve device 1 may comprise a casing having a piston chamber 9, connected by passage 10 to the brake pipe 7 and containing piston 11, and a valve chamber 12, connected to the auxiliary reservoir 5, and containing a main slide valve 13, and a graduating slide valve 14, adapted to be operated by piston 11.

The emergency valve device 2 comprises a casing having a piston chamber 15 connected by passage 16 to the brake pipe 7 and containing a piston 17, and having a valve chamber 18 containing a main valve 19 and an auxiliary valve 20 adapted to be operated by piston 17. Associated with the emergency valve device is a valve piston 21 subject on one side to the pressure of a coil spring 22 and on the opposite side to the pressure in a chamber 23, which chamber is connected, through pipe 24, with the brake cylinder 4.

The vent valve device 3 comprises a casing containing a piston 25, the chamber 26 at one side being connected to a passage 27, leading to the seat of slide valve 19. The piston 25 is adapted to operate a vent valve 28 for venting fluid under pressure from the brake pipe 7.

The release controlling valve device 8 comprises a casing in which is mounted a flexible diaphragm 29, having the chamber 30 at one side connected to the brake pipe 7. The valve chamber 31 at the opposite side of the diaphragm contains a slide valve 32 adapted to be operated, through a stem 33, by the diaphragm 29. A coil spring 34 acts on the stem 33 and urges the stem 33 and the diaphragm 29 upwardly. The valve chamber 31 is connected to a pipe 35 which leads to the seat of slide valve 13.

In operation, with the brake pipe 7 charged with fluid under pressure, fluid flows to the piston chamber 9, through passage 10, and with the piston 11 in release position, as shown in the drawing, fluid flows through passage 36, past check valve 37 to passage 38, charging the valve chamber 12 and the auxiliary reservoir 5 with fluid under pressure. Fluid also flows through passage 36, past check valve 39 to passage 40 and pipe 41, charging the emergency reservoir 6.

In the release position of slide valve 13, a cavity 42 connects pipe 35 with a pipe 43, leading to the brake pipe 7, so that in release, the valve chamber 31 is maintained at brake pipe pressure. The chamber 30 at the opposite side of the diaphragm 29 being also maintained at brake pipe pressure, the spring 34 operates to hold the diaphragm 39 and slide valve 32 in the position shown in the drawing, in which the slide valve 32 blanks an atmospheric exhaust port 44.

The piston chamber 15 of the emergency valve device 2 is also charged with fluid from the brake pipe by way of passage 16, and with the piston 17 in release position, fluid flows from chamber 15 through passage 45, and past check valve 46 to passage 47, which leads to valve chamber 18. The valve chamber 18 and the quick action reservoir 48 are thus charged to brake pipe pressure.

If it is desired to effect an emergency application of the brakes, a sudden reduction in brake pipe pressure is made and the triple valve piston 11 moves out to emergency position, in which port 49 in the main slide valve 13 registers with passage 50 leading to the brake cylinder pipe 24. Fluid under pressure is then supplied from the auxiliary reservoir 5 to the brake cylinder 4. The emergency piston 17 is also shifted to emergency position by the sudden reduction in brake pipe pressure, and the slide valve 19 is shifted so that the chamber 51 at the under side of the valve piston 21 is vented to the atmosphere, through passage 52, cavity 53 in slide valve 19 and exhaust port 54.

When the brake cylinder pressure acting in chamber 23 has been increased by flow from the auxiliary reservoir to a degree sufficient to overcome the pressure of spring 22, the valve piston 21 is shifted downwardly so as to open communication from passage 55 and the emergency reservoir 6 to the chamber 23 and the brake cylinder 4. The brake cylinder pressure is thus increased by flow of fluid under pressure from the emergency reservoir 6.

In emergency position of slide valve 19, port 56 in the slide valve is uncovered by the movement of the auxiliary valve 20 and since said port registers with passage 27, fluid under pressure is supplied from the quick action reservoir 48 to piston chamber 26, so that piston 25 is operated to open the vent valve 28 and thereby effect a local reduction in brake pipe pressure.

In the emergency position of the slide valve 13, pipe 35 is cut off from communication with pipe 43 and the brake pipe 7 and said pipe 35 is then connected to valve chamber 12 and the auxiliary reservoir 5. Thus the chamber 31 of the release controlling valve device 8 is subject to auxiliary reservoir pressure in the emergency position of the triple valve device. The brake pipe pressure acting in chamber 30 being less than the auxiliary reservoir pressure acting in chamber 31, the diaphragm 29 is maintained in the position shown in the drawing.

When the brake pipe pressure is increased to effect the release of the brakes, the pressure in chamber 30 is likewise increased and when the pressure in chamber 30 has been increased to exceed the auxiliary reservoir pressure in chamber 31 by an amount slightly in excess of the pressure of spring 34, the diaphragm 29 will be shifted downwardly, so that slide valve 32 is moved to cause port 57 to register with port 44. Fluid under pressure is then vented from valve chamber 31 and from the auxiliary reservoir 5, through pipe 35, so that the auxiliary reservoir pressure is reduced until the brake pipe pressure in chamber 9 operates to shift the triple valve piston 11 toward release position against the reduced auxiliary reservoir pressure. As soon as the slide valve 13 is moved away from emergency position, communication from the auxiliary reservoir to chamber 31 is cut off, so that further reduction in auxiliary reservoir pressure is prevented, and when the slide valve 13 is moved to release position, the chamber 31 is again connected to the brake pipe, so that the fluid pressures on opposite sides of the diaphragm 29 are equalized, permitting the spring 34 to shift the diaphragm 29 and slide valve 32 to the position shown in the drawing, in which communication from chamber 31 to the atmosphere is cut off.

The spring 34 acting on the diaphragm 29, prevents downward movement of the diaphragm until the brake pipe pressure has been increased to a predetermined degree above the auxiliary reservoir pressure and this provides for the normal shifting of the triple valve piston 11 from emergency position and it is only in the event the triple valve piston fails to move, that the release valve device 8 operates to vent fluid from the auxiliary reservoir, so that an unnecessary waste of fluid from the auxiliary reservoir is prevented.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, auxiliary reservoir, and an equalizing valve device subject to the opposing pressures of the brake pipe and auxiliary reservoir and having a release position and an emergency application position, of a release controlling valve device comprising a valve for controlling the venting of fluid under pressure from the auxiliary reservoir, and a movable abutment exposed on one side to the fluid pressure in a chamber, for operating said valve, said equalizing valve device being adapted in release position to open communication from the brake pipe to said chamber and in emergency position from the auxiliary reservoir to said chamber.

2. In a fluid pressure brake, the combination with a brake pipe, auxiliary reservoir, and an equalizing valve device subject to the opposing pressures of the brake pipe and auxiliary reservoir and having a release position and an emergency application position, of a release controlling valve device comprising a valve for controlling the venting of fluid under pressure from the auxiliary reservoir, a movable abutment for operating said valve subject on one side to brake pipe pressure, and means controlled by said equalizing valve device for connecting the opposite side of said abutment to the brake pipe in release position of said equalizing valve device and for connecting said opposite side to the auxiliary reservoir only in the emergency position of said equalizing valve device.

3. In a fluid pressure brake, the combination with a brake pipe, auxiliary reservoir, and an equalizing valve device subject to the opposing pressures of the brake pipe and auxiliary reservoir and having a release position and an emergency application position, of a release controlling valve device comprising a valve for controlling the venting of fluid under pressure from the auxiliary reservoir, a spring, a movable abutment for operating said valve, and subject to the opposing pressures of the brake pipe and said spring, and means adapted in the release position of said equalizing valve device to connect the spring side of said abutment with the brake pipe and only in the emergency position to connect the spring side of said abutment to the auxiliary reservoir.

4. In a fluid pressure brake, the combination with a brake pipe, auxiliary reservoir, and an equalizing valve device subject to the opposing pressures of the brake pipe and auxiliary reservoir and having a release position and an emergency application position, of a release controlling valve device comprising a valve for controlling the venting of fluid under pressure from the auxiliary reservoir, a spring, a movable abutment for operating said valve, and subject to the opposing pressures of the brake pipe and said spring, and means for connecting the auxiliary reservoir to the spring side of said abutment only in the emergency position of said equalizing valve device, so that upon increasing the brake pipe pressure to a degree slightly exceeding the pressure of the spring plus the auxiliary reservoir pressure, the valve will be operated by said abutment to vent fluid from the auxiliary reservoir.

5. In a fluid pressure brake, the combination with a brake pipe, auxiliary reservoir, brake cylinder, and an equalizing valve device subject to the opposing pressures of the brake pipe and the auxiliary reservoir and operated by variations in brake pipe pressure for controlling the admission of fluid under pressure to and its release from the brake cylinder, of a release controlling valve device having a movable abutment subject in brake application position of the equalizing valve device to the opposing pressures of the brake pipe and the auxiliary reservoir and valve means operated by said abutment upon a predetermined increase in brake pipe pressure to vent fluid under pressure from the auxiliary reservoir, said equalizing valve device including a slide valve adapted upon movement of said valve device to brake application position to uncover a passage through which communication is established from the auxiliary reservoir to said release controlling valve device.

6. In a fluid pressure brake, the combination with a brake pipe, auxiliary reservoir, and an equalizing valve device subject to the opposing pressures of the brake pipe and auxiliary reservoir and movable to emergency position upon a sudden reduction in brake pipe pressure, of a release controlling valve device operative upon a predetermined increase in brake pipe pressure for venting fluid under pressure from the auxiliary reservoir, said equalizing valve device including a slide valve adapted upon movement of said valve device to emergency brake application position to uncover a passage through which communication is established from the auxiliary reservoir to said release controlling valve device.

7. In a fluid pressure brake, the combination with a brake pipe, auxiliary reservoir, and a brake controlling valve device subject to the opposing pressures of the brake pipe and auxiliary reservoir and having a release position and a brake application position, of a release controlling valve device comprising a valve for venting fluid from the auxiliary reservoir and a movable abutment subject on one side to brake pipe pressure, and means controlled by said brake controlling valve device for supplying fluid from the auxiliary reservoir to the other side of said abutment upon movement of said brake controlling valve device to application position and for cutting off communication through which fluid is supplied from the auxiliary reservoir to said abutment upon movement of said brake controlling valve device from application position and in advance of its movement to release position.

CLYDE C. FARMER.